United States Patent [19]

Nett et al.

[11] 4,069,064

[45] Jan. 17, 1978

[54] PHTHALOCYANINE FORMULATIONS HAVING HIGH GLOSS, WHICH ARE STABILIZED AGAINST RECRYSTALLIZATION AND AGAINST CHANGE OF MODIFICATION

[75] Inventors: Robert Nett, Neustadt; Wolf Dieter Fechner, Dirmstein; Werner Jettmar, Mannheim; Rudolf Polster, Frankenthal; Reinhard Sappok, Heidelberg; Eduard Hartmann, Limburgerhof, all of Germany

[73] Assignee: BASF Aktiengesellschaft, Ludwigshafen, Germany

[21] Appl. No.: 669,842

[22] Filed: Mar. 24, 1976

[30] Foreign Application Priority Data

Apr. 12, 1975 Germany .................. 2516054

[51] Int. Cl.$^2$ ............................................. C09B 47/04
[52] U.S. Cl. ........................... 106/193 P; 106/22; 106/23; 106/26; 106/30; 106/32; 106/218; 106/285; 260/242.2; 260/314.5
[58] Field of Search .............. 260/314.5, 242, 243 B, 260/247.1 E, 247.1 L, 268 PC, 270 P, 293.61; 8/1 A; 106/193 P, 22, 23, 26, 30, 32, 218, 285

[56] References Cited

U.S. PATENT DOCUMENTS

3,492,253  1/1970  Katz et al. .................. 260/17

FOREIGN PATENT DOCUMENTS

1,241,143  7/1971  United Kingdom .............. 260/314.5

OTHER PUBLICATIONS

Diserens et al., Chemical Technology of Dyeing and Printing, pp. 8 to 9, Reinhold Publishing Corp. (1948).
Moser et al., Phthalocyanine Compounds, pp. 162 to 165 and frontispage, Reinhold Pub. Corp. 1963.

*Primary Examiner*—Richard L. Raymond
*Attorney, Agent, or Firm*—Keil, Thompson & Shurtleff

[57] ABSTRACT

A phthalocyanine formulation which is stabilized against recrystallization and change of modification and which contains, as the stabilizer (a) a finely divided phthalocyanine as the pigment and (b) a salt or the corresponding homogeneous mixture of ($\alpha$) a phthalocyanine derivative, which carries basic groups

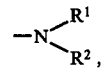

($R^1$ = H, alkyl of 1 to 20 carbon atoms, unsubstituted or substituted phenyl, —$C_2H_4$—NH)$_z$H or —($C_3H_6$—NH)$_z$H, $z$ = 1, 2 or 3, and $R^2$ = H, alkyl of 1 to 6 carbon atoms or cycloalkyl of 6 to 8 carbon atoms) and ($\beta$) an aliphatic sulfonic acid of 8 to 20 carbon atoms, a monoalkylbenzenesulfonic acid or dialkylbenzenesulfonic acid where alkyl is of 6 to 20 carbon atoms, or a monoalkylnaphthalenesulfonic acid or dialkylnaphthalenesulfonic acid where alkyl is of 6 to 20 carbon atoms, which acids may be substituted by hydroxyl, the molar ratio of $\alpha$:$\beta$ being from 1:1 to 1:5, and, if desired, one or more organic fluids or solutions of resins in these fluids. The formulations are stable even in aromatic hydrocarbons and produce pure, deep colorations which have high gloss.

14 Claims, No Drawings

PHTHALOCYANINE FORMULATIONS HAVING HIGH GLOSS, WHICH ARE STABILIZED AGAINST RECRYSTALLIZATION AND AGAINST CHANGE OF MODIFICATION

The present invention relates to phthalocyanine formulations which are stabilized against recrystallization and change of modification and which give colorations having high gloss, and to the manufacture and use of such formulations.

Because of their very small particle size, many organic pigments can only be dispersed unsatisfactorily, and with great effort, in binder systems. Because of the high proportion of agglomerated particles, films which have been colored with such formulations have little gloss. Furthermore, such colored compositions frequently exhibit poor flow. A particularly conspicuous exmaple which may be mentioned are the phthalocyanines, which present difficulties and problems in this respect. In the past, attempts to improve these properties have been based on using additives and special methods of preparation.

Thus, eg., copper phthalocyanines having basic substituents are added to phthalocyanine derivatives. A review, with examples taken from the patent literature, is given by K. Merkle and H. Schafer in "Surface Treatment of Organic Pigments" in Pigment Handbook, Vol. III, pages 157 et seq., T. C. Patton, ed., John Wiley and Sons, New York, London, Sydney, Toronto, 1973. These additives improve, eg., the flocculation stability of the pigments. On the other hand, the dispersibility, the gloss and especially the fastness properties are frequently made worse. Another approach which especially improves the dispersibility entails the addition of resins and polymers (see, eg., British Pat. Nos. 1,144,041, 1,138,465, 1,139,294, 957,984 and 957,440, U.S. Pat. Nos. 3,492,253 and 3,431,130, Swiss Pat. No. 476,686, German printed application Nos. 1,719,402 and 1,669,157, German published application Nos. 2,205,171 and 2,124,051 and German printed application No. 1,904,432).

Such formulations are very effective for certain applications, but their applicability is limited because of the incompatibility, or the adverse effect on the surface finish, of the requisite additives.

It is an object of the present invention to provide formulations of phthalocyanine pigments which contain novel additives which are compatible with the media conventionally employed. The additives should significantly improve the technological properties of the pigments or formulations, eg. dispersibility, flocculation characteristics, flow properties and gloss and should prevent the recrystallization and change of modification even in the presence of aromatic solvents, since these phenomena can also cause deterioration, in the above sense.

We have found that these objects are achieved and that the disadvantages described can be overcome by the use of pigment formulations which contain
 a. a finely divided phthalocyanine as the pigment and
 b. from 10 to 40 per cent by weight, based on (a), of a salt or the corresponding homogeneous mixture of (α) one or more phthalocyanine derivatives of the formula

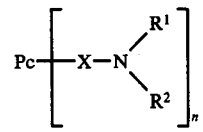

where Pc is an n-valent radical of the metal-free phthalocyanine, of a copper phthalocyanine or of a mixture of these, X is —CH$_2$—,

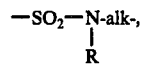

—CH$_2$—COOC$_2$H$_4$— or —CH$_2$—CH$_2$—COO—C$_3$H$_6$—, R$^1$ is hydrogen, alkyl of 1 to 20 carbon atoms, phenyl which is unsubstituted or substituted by methyl, methoxy, ethoxy or chlorine, —(C$_2$H$_4$-NH)$_z$H or —(C$_3$H$_6$—NH)$_z$H, R$^2$ is hydrogen, alkyl of 1 to 6 carbon atoms or cycloalkyl of 6 to 8 carbon atoms, alk is linear or branched saturated alkylene of 2 to 6 carbon atoms, R is hydrogen or alkyl of 1 to 4 carbon atoms, and R and R$^2$ may be linked to one another, n is a number from 2 to 5, z is an integer from 1 to 3 and the group

may also be a saturated 5-membered, 6-membered or 7-membered heterocyclic ring which may contain one O, N or S as a further ring member, and (β) a saturated or unsaturated aliphatic sulfonic acid of 8 to 20 carbon atoms, an aromatic sulfonic acid which is substituted by one or two alkyl groups each of 6 to 20 carbon atoms and may also be substituted by hydroxyl, or mixtures thereof, the molar ratio of (α):(β) being from 1:1 to 1:5, and the said mixture acting as a stabilizer, and, if appropriate,
 c. one or more organic fluids or solutions of resins in organic fluids.

The surface finishes or printing inks colored with the formulations according to the invention produce deep colorations which have high gloss. Furthermore, the phthalocyanine pigments in the formulations, and in the surface finishes and printing inks, are found to be stabilized both against recrystallization and against change of modification. Thus, eg., α-copper phthalocyanine which does not contain halogen is stable in the formulations according to the invention, ie. in the presence of (b), even in aromatic hydrocarbons, eg. boiling benzene. Neither recrystallization nor conversion to the β-modification takes place.

Phthalocyanine pigments (a) which may be used for the formulations according to the invention are, quite generally, all phthalocyanines, whether metal-free or containing heavy metal atoms, eg. copper, cobalt, nickel or iron, bound as a complex. Examples to be mentioned particularly are metal-free phthalocyanines in the α-, β- or x-modification, copper phthalocyanines in the α-, β-, γ-, δ- and ε-modifications, which are free from chlorine or bromine or which may contain an average of up to 2 chlorine atoms or bromine atoms in the molecule, polychloro-copper phthalocyanines with up to 16 chlorine atoms, and polychlorobromo-copper phthalocyanines with from 1 to 14 chlorine atoms and from 15 to 2 bromine atoms in the molecule. The phthalocyanines are in a pigment form or in the form of very fine particles.

Suitable phthalocyanine derivatives (α) are those of the formula I, where Pc is an n-valent metal-free phthalocyanine radical or an n-valent copper phthalocyanine radical which may contain an average of 1 or 2 chlorine atoms and/or up to 1.5 sulfonic acid groups per phthalocyanine system.

n is a number from 1 to 5, preferably from 2 to 4. Due to the method of manufacture, (α) is as a rule a mixture of two or more compounds, where n is on average from 1 to 5, preferably from 2 to 4.

In the formula I, X is
1. $-CH_2-$

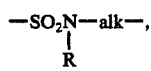   2)

where alk is linear or branched saturated alkylene of 2 to 6 carbon atoms, preferably of 2 or 3 carbon atoms, and R is lower alkyl, eg. of 1 to 4 carbon atoms or, preferably, is hydrogen, or 3. $-CH_2-CH_2-COOC_2H_4-$ or $-CH_2-CH_2-COO-C_3H_6-$.

Specific examples of X, in addition to $-CH_2-$, are:

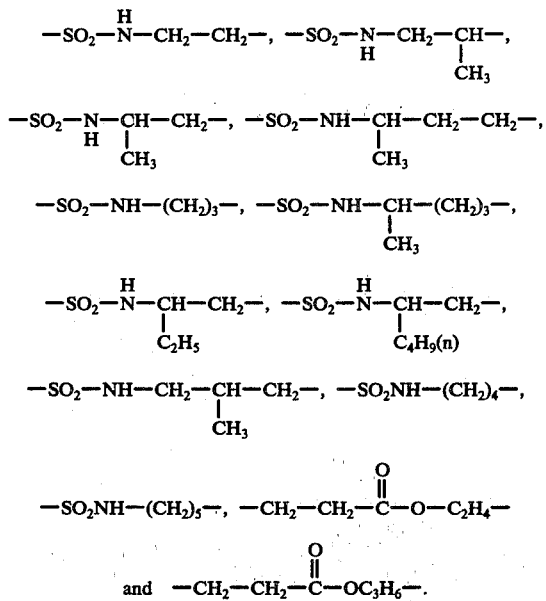

Substituents of $R^1$, other than hydrogen, may be alkyl of 1 to 20 caarbon atoms, preferably of 1 to 10 carbon atoms, or phenyl, which is unsubstituted or substituted by methyl, chlorine, methoxy or ethoxy, or the group $-(C_2H_4-NH)_zH$ or $-(C_3H_6-NH)_zH$, where z is an integer from 1 to 3, and is preferably 1 or 2. Specific examples of $R^1$ are hydrogen, methyl, ethyl, propyl, n-butyl, isobutyl, sec-butyl, pentyl, i-pentyl, hexyl, i-hexyl, octyl, 2-ethylhexyl, nonyl, decyl, dodecyl, palmityl and stearyl, and also phenyl, o-, m- or p-tolyl, chlorophenyl, o-, m- or p-methoxyphenyl, o-, m- or p-ethoxyphenyl and the radicals $-C_2H_4-NH_2$, $-C_2H_4-NH-C_2H_4-NH_2$, $-C_2H_4-NH-C_2H_4-NH-C_2H_4-NH_2$, $-C_3H_6-NH_2$, $-C_3H_6-NH-C_3H_6-NH_2$ and $-C_3H_6-NH-C_3H_6-NH-C_3H_6-NH_2$.

$R^2$ in the formula (I) is hydrogen, alkyl of 1 to 6 carbon atoms or cycloalkyl of 6 to 8 carbon atoms. Specific examples of $R^2$ are methyl, ethyl, propyl, butyl, i-butyl, sec.-butyl, pentyl, hexyl, cyclohexyl, methylcyclohexyl and dimethylcyclohexyl, amongst which alkyl of 1 to 4 carbon atoms, eg. methyl, ethyl, propyl or butyl, and cyclohexyl, are preferred.

The group

may furthermore be a saturated 5-membered, 6-membered or 7-membered heterocyclic ring which may in addition contain O or S, or a further N as further ring members. Specific examples are thiomorpholinyl, morpholinyl, preferably piperazinyl, N-methylpiperazinyl, N-ethylpiperazinyl, piperidinyl, pyrrolidinyl and the hexamethyleneimine radical

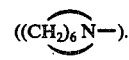

The phthalocyanine derivatives (α) are known per se, or are known in principle. They are manufactured by conventional processes or, in the case of the new compounds (α), by processes which in themselves are conventional.

For example, the chloromethyl(copper)-phthalocyanines may be reacted with primary or secondary aliphatic or cycloaliphatic amines or mixed aromatic-aliphatic secondary amines of the formula

where $R^1$ and $R^2$ have the above meanings.

Examples of suitable amines of the formula (II) are methylamine, dimethylamine, diethylamine, dipropylamine, dibutylamine, hexylamine, cyclohexylamine, N-methylcyclohexylamine, octylamine, 2-ethylhexylamine, decylamine, dodecylamine, octadecylamine (stearylamine) and hexadecylamine (palmitylamine).

Further suitable amines (II) in this case are 5-membered, 6-membered or 7-membered saturated basic heterocyclic compounds which may in addition contain O, S or a further N as ring members. Examples of these are pyrrolidine, piperidine, morpholine, thiomorpholine, piperazine and N'-alkylpiperazines such as N'-methylpiperazine or N'-ethylpiperazine.

For economic, technical and tinctorial reasons, alkylamines with lower alkyl groups, especially those with alkyl of 1 to 4 carbon atoms, are preferred.

A further possible method of preparing compounds of the formula I, where X = $-CH_2-$, is to alkylate the corresponding aminomethylene compounds

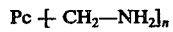

by conventional methods, eg. by reaction with alkyl chlorides or bromides, such as methyl chloride, methyl bromide, ethyl chloride, ethyl bromide, propyl chloride, propyl bromide, butyl chloride or butyl bromide.

Phthalocyanine derivatives of the formula I, where X is $$-SO_2-\underset{R}{N}-alk-,$$

in which R and alk have the above meanings, are preferably manufactured by reacting phthalocyaninesulfonic acid chlorides of the formula $$Pc + SO_2Cl]_n$$

with diamines of the formula $$HN-alk-\underset{R}{N}\diagup^{R^1}_{R^2} \quad (III)$$

by conventional methods.

Examples of suitable diamines (III) for the manufacture of these phthalocyanine derivatives (I) are: 2-dimethylaminoethylamine, 2-diethylamino-ethylamine, 2-dipropylamine-ethylamine, 2-dibutylamino-ethylamine, 3-dimethylamino-propylamine, 3-diethylamino-propylamine, 3-dibutylamino-propylamine, 3-(methylcyclohexylamino)-propylamine, 3-cyclohexylamino-propylamine, 3-(N-methyl-N-cyclohexyl)-propylamine, 2-cyclohexylaminoethylamine, 2-(N-methyl-N-cyclohexylamino)-ethylamine, 3-hexylamino-propylamine, 3-octylamino-propylamine, 3-(2'-ethylhexylamino)-propylamine, 3-decylamino-propylamine, 3-dodecylaminopropylamine, 3-palmitylaminopropylamine, 3-stearylamino-propylamine, 2-hexylamino-ethylamine, 2-octylamino-ethylamine, 2-(2'-ethylhexylamino)-ethylamine, 2-decylamino-ethylamine, 2-dodecylamino-ethylamine, 2-palmitylamino-ethylamine, 2-stearylamino-ethylamine, 2-amino-1-dimethylamino-butane, 2-amino-1-diethylamino-butane, 2-amino-2-dibutylamino-butane, 2-amino-1-dimethylamino-hexane, 2-amino-1-diethylamino-hexane, 2-amino-1-dipropylamino-hexane, 2-methyl-1-amino-3-dimethylaminopropane, 2-methyl-1-amino-3-diethylamino-propane, 2-methyl-1-amino-3-dipropylamino-propane, 2-methyl-1-amino-3-dibutylamino-propane, 4-dimethylamino-1-amino-butane, 4-diethylamino-1-amino-butane, 4-dibutylamino-1-amino-butane, 6-dimethylamino-1-amino-hexane, 6-diethylamino-1-amino-hexane, 4-diethylamino-1-methyl-butylamine-(1), 4-dimethylamino-1-methyl-butylamine-(1), 2-(N-pyrrolidinyl)-ethylamine, 3-(N-pyrrolidinyl)-propylamine, 2-(N-piperidinyl)-ethylamine, 3-(N-piperidinyl)-propylamine, 2-(N-morpholinyl)-ethylamine, 3-(N-morpholinyl)-propylamine, 3-(N-thiomorpholinyl)-propylamine, 2-(N-thiomorpholinyl)-ethylamine, 3-(N-piperazinyl)-propylamine, 3-(N'-methyl-N-piperazinyl)-propylamine, 3-(N'-ethyl-N-piperazinyl)-propylamine, 2-(N-piperazinyl)-ethylamine, 2-(N'-methyl-N-piperazinyl)-ethylamine and 2-(N'-ethyl-N-piperazinyl)ethylamine.

Preferred phthalocyanine derivatives ($\alpha$), for technical and tinctorial reasons, are the reaction products of phthalocyaninedisulfonic, -trisulfonic and -tetrasulfonic acid chlorides, especially of copper phthalocyaninedisulfonic, -trisulfonic and -tetrasulfonic acid chlorides (n = 2, 3 and 4), with those amines of the formula III where alk is a $-C_2H_4-$ or $-C_3H_6-$, R is hydrogen and $R^1$ and $R^2$ are lower alkyl, especially alkyl of 1 to 4 carbon atoms, or $R^1$ is cyclohexyl.

Suitable sulfonic acids ($\beta$) are 1) saturated or unsaturated aliphatic sulfonic acids of 8 to 20 carbon atoms, preferably of 10 to 20 carbon atoms, and 2) benzenesulfonic acids or naphthalenesulfonic acids which are substituted by one or two alkyl groups each of 6 to 20, preferably 11 to 20, carbon atoms and the benzene and naphthalene nuclei may also be substituted by hydroxyl.

Examples of sulfonic acid ($\beta$) are:

1. aliphatic sulfonic acids: octanesulfonic acid, decanesulfonic acid, dodecanesulfonic acid, tridecanesulfonic acid, hexadecanesulfonic acid and octadecanesulfonic acid.

2. aromatic sulfonic acids: p-hexylbenzenesulfonic acid, octylbenzenesulfonic acid, nonylbenzenesulfonic acid, dodecylbenzenesulfonic acid, hexadecylbenzenesulfonic acid, octadecylbenzenesulfonic acid, o-hydroxy-m,m'-bis-dodecylbenzenesulfonic acid, o-hydroxynonylbenzenesulfonic acid, o-hydroxydodecylbenzenesulfonic acid, hydroxyhexadecylbenzenesulfonic acid, hydroxyoctadecylbenzenesulfonic acid, and also monoalkylnaphthosulfonic acids and dialkylnaphtholsulfonic acids, where alkyl is of 8 to 20 carbon atoms and of 4 to 20 carbon atoms respectively, and 1-alkene-1-sulfonic acids of 8 to 20 carbon atoms and 2-hydroxy-alkane-1-sulfonic acids of 8 to 20 carbon atoms.

Preferred sulfonic acids are monoalkylbenzenesulfonic acids and dialkylbenzenesulfonic acids, and monoalkylphenolsulfonic acids and dialkylphenolsulfonic acids, in which alkyl is in each case of 8 to 18 carbon atoms, and aliphatic sulfonic acids of 10 to 20 carbon atoms, since these, when combined with (a), give particularly high gloss whilst at the same time providing good stabilization against recrystallization and change of modification.

Specific examples of preferred sulfonic acids ($\beta$) are: dodecylbenzenesulfonic acid, dodecylphenolsulfonic acid, didodecylphenolsulfonic acid, dodecylnaphtholsulfonic acid, nonylphenolsulfinic acid, nonylbenzenesulfonic acid, octadecylphenolsulfonic acid, octadecylsulfonic acid, hexadecylsulfonic acid, 1-tetradecene-1-sulfonic acid, 1-octadecene-1-sulfonic acid, hydroxyoctadecylsulfonic acid, dodecylnaphthol-(1)-sulfonic acid, didodecylnaphthaol-(1)-sulfonic acid, octylnaphthol-(1)-sulfonic acid and dioctylnaphthol-(1)-sulfonic acid.

The stabilizing agent (b) can be used either in the form of the salt from ($\alpha$) and ($\beta$), which may also contain an excess of the sulfonic acid ($\beta$) or of ($\alpha$), or in the form of a mechanical intimate homogeneous mixture of ($\alpha$) and ($\beta$).

Thus, eg., ($\alpha$) and ($\beta$) may be brought together in the desired molar ratio, eg. in organic solvents, and (b) isolated in the solid form from the solution by concentrating, and distilling off the solvent. The stabilizing agent (b) thus obtained is hereinafter referred to as salt.

As a rule, an intimate and homogeneous mechanical mixture of ($\alpha$) and ($\beta$), in the appropriate molar ratio, can be used equally successfully as (b). This mixture of ($\alpha$) and ($\beta$) may be obtaind, eg., by grinding or intensive mixing in mixing equipment.

The molar ratio of phthalocyanine derivative ($\alpha$) to sulfonic acid ($\beta$) is from 1:1 to 1:5. Preferably (b) consists of salts or mixtures which contain ($\alpha$) and ($\beta$) in a molar ratio of from 1:2 to 1:4, since these give an optimum gloss coupled with very good stabilizing action.

The amount of (b) is as a rule from 10 to 40 percent by weight, preferably from 20 to 30 percent by weight, based on (a). The amount of (b) depends on how finely divided is the pigment (a). In general, the amount to be added decreases with decreasing specific surface area.

The proportion of (b) in the formulation can also be increased to above 40 percent by weight. However, the addition of such high proportions does not produce any advantages such as a further increase of gloss. As a rule, optimum gloss is achieved if from 20 to 30 percent by weight of (b) is added, based on (a).

Organic fluids (c) which may be used for the manufacture of the formulations and which may contain one or more dissolved resins are those conventionally used for the manufacture of printing inks, paints and pigment pastes, eg. aromatic hydrocarbons, such as benzene, toluene, ethylbenzene and xylene, halohydrocarbons, eg. chlorobenzene, alcohols, eg. methanol, ethanol, propanol, isopropanol, n-butanol, isobutanol, sec.-butanol and tert.-butanol, glycols, eg. ethylene glycol, diethylene glycol, propylene glycol and dipropylene glycol, and their monoalkyl ethers in which alkyl is of 1 to 4 carbon atoms, polyglycols such as polyethylene glycol and polypropylene glycol, diacetone-alcohol, benzyl alcohol, phenol, substituted phenols, naphthols and substituted naphthols, such as the cresols and xylenols, ketones such as acetone, methyl ethyl ketone, methyl isobutyl ketone, acetophenone and cyclohexanone, carboxylic acid esters, such as the esters of acetic acid, propionic acid, glycollic acid or lactic acid with aliphatic alcohols of 1 to 5 carbon atoms or with glycols, carboxylic acid amides, such as dimethylformamide and N-methylpyrrolidone, and mixtures of these fluids. Resins which may be contained in the organic fluids can be natural, semi-synthetic and/or synthetic resins. As examples of these there should be mentioned natural resins such as rosin, copal, damar and shellac, semi-synthetic resins such as oligomeric and polymeric rosin, rosin esterified with aliphatic momohydric or polyhydric alcohols and/or with phenols, calcium, zinc or magnesium salts of rosin (so-called resinates), cellulose esters, cellulose ethers and rubber derivatives, synthetic resins such as maleic acid resins, phenolic resins, urea-formaldehyde resins, melamine resins, aldehyde resins and ketone resins, polyester resins, polymerization resins such as polyacrylate resins, polyvinyl acetate, polystyrene, polyisobutylene, polyamide resins, epoxy resins and silicone resins, or mixtures of different resins.

The formulations according to the invention may be produced in the form of powders or in the form of fluid formulations.

A possible procedure for the manufacture of pulverulent preparations is that the salt (b) previously prepared from ($\alpha$) and ($\beta$), in the form of a solid, is added to the pigment (a) and the powder is homogenized in a grinding apparatus, such as a ball mill, edge runner or high-speed mixer.

However, an alternative procedure is first to manufacture a formulation in water or, preferably, in a readily removable organic fluid, and then to obtain the pulverulent formulation therefrom by evaporation, spray drying or freeze drying. The first-mentioned process is preferred for the industrial manufacture of the pulverulent mixtures.

The fluid preparations can be prepared, eg., by dispersing, and homogenizing, a suspension of (a) and (b) or of (a), ($\alpha$) and ($\beta$), in a readily removable organic fluid, in a dispersing apparatus which contains grinding media consisting of porcelain, glass, sand or steel, eg. in a ball mill, stirred ball mill or sand mill.

The same method can be used to prepare fluid preparations, in which case the organic fluids are not removed.

If the components (a) and (b) are present in a rather high concentration in (c), or if (c) is a viscous resins solution, the dispersion process can also be carried out in a kneader or mixer.

It is advantageous first to react ($\alpha$) with ($\beta$) to give (b), if desired in an organic fluid, and then to incorporate the resulting (b) into (a), preferably in the presence of organic fluids or a resin solution. The incorporation of (b) into (a), and the homogenization, are carried out in suitable dispersing equipment, eg. kneaders, ball mills, sand mills or stirred ball mills.

An alternative procedure is first to suspend the pigment or crude pigment (a) in the orgaic fluid or in the resin solution (c) and then to add (b), either in the form of the previously prepared salt or in the form of a mechanical homogeneous mixture, or to add the components ($\alpha$) and ($\beta$) separately, to the suspension, after which the resulting mixture is stirred, mixed and then dispersed.

For the industrial manufacture of the fluid formulations according to the invention, the two last-mentioned procedures are particularly advantageous and therefore preferred.

The formulations according to the invention can in addition contain other assistants, eg. dispersion stabilizers or assistants conventionally used for particular applications. Thus, eg., formulations which are intended for the manufacture of printing inks can contain, in addition to the resins used as binders, assistants conventionally employed for printing inks, eg. anti-penetration agents, dryers and the like. These assistants, provided they are in a finely divided form, have no effect, or virtually no effect, on the gloss, or on the stabilization against recrystallization and change of modification.

The pulverulent and the fluid formulations according to the invention are of equal quality. Both forms can be incorporated into surface coatings or printing inks, into organic fluids or into resin solutions. In the case of the pulverulent formulations, it very often suffices to incorporate them by simple stirring with a high speed stirrer (dissolver), since the pigment contained in the pulverulent formulations is also easily dispersible in systems containing solvents. Of course, a formulation in the form of a paste is easier to incorporate into many fluid media.

Organic pigments milled without addition of (b) in general have poor pigmentary properties. Surprisingly, this deterioration does not occur if the additives according to the invention are present. The pulverulent formulations described have the advantage over conventional pigments that their bulk density is greater. This means that they can be packaged in a smaller volume and create less dust during use.

Since the pulverulent formulations of the invention contain no constituents which are incompatible with systems to be pigmented, they can be employed universally, in contrast to the fluid formulations.

The colorations, prints and surface coatings obtained with the formulations according to the invention have similar tinctorial properties to the pigments (a). Thus, surprisingly, the colorations have equal fastness to light, overspraying, solvents and bleeding to the pigments (a) on which they are based, while being significantly superior, in gloss and brilliance of color, to those obtained only with the pure pigment (a). In surface coatings, the rub-out behavior is also found to be improved.

After dispersion in binders containing solvents, the pigment formulations according to the invention are in a substantially more finely divided form than are conventional pigments. This can be demonstrated by means of a bowl (or disk) centrifuge (the method is described by J. Fraser in "Pigment Handbook", Vol. III, page 53, T. C. Patton, ed., John Wiley and Sons, New York, London, Sydney, Toronto, 1973). For example, after dispersion for 20 minutes in a toluene-based printing ink for gravure application, 50% of the particles are smaller than $0.069\mu$, as compared with $0.140\mu$ in the case of a good conventional pigment.

The very good rheological characteristics, especially of toluene-based gravure printing inks, are noteworthy. In general, a significant deterioration in flow is observed as the particle size decreases. (P. Hauser, M. Herrmann and B. Honigmann, farbe + lack 77, 1097 (1971)). In the present case, on the other hand, this effect is significantly diminished. Simultaneously therewith, significant deflocculation of the dispersions is observed.

The Examples which follow illustrate the invention. Parts and percentages are by weight. Parts by volume bear the same relation to parts by weight as the liter to the kilogram.

EXAMPLE 1 a. 20 parts of copper phthalocyanine in the $\beta$-modification, in the pigmentary form, 2.5 parts of tris-diethylaminomethylene-copper phthalocyanine and 2.5 parts of dodecylbenzenesulfonic acid in 75 parts of toluene are dispersed by means of 100 parts by volume of glass beads (diameter 3 mm) in a closed vessel on a shaker (®Red Devil) for 2 hours. A very fluid paste is obtained which is outstandingly suitable for pigmenting printing inks.

b. Manufacture of the printing ink 8 parts, based on solids, of the preparations from Examples 1 to 4 were dispersed for 20 minutes in 92 parts of a 35% strength toluene ® Albertol surface finish, using a toothed disc stirrer.

The rheological properties of these inks are shown in Table 1. The tinctorial properties of the colorations produced with these printing inks are shown in Table 2, the gloss of the prints in Table 1. The gloss of prints and dyeings was determined in accordance with DIN 67530 "Reflektometer als Hilfsmittel zur Glanzbeurteilung an ebenen Anstrich- und Kunststoffoberflachen" by the 20-deg procedure using a Gardener multi-angle glossmeter GG 9095 as marketed by Erichsen GmbH & Co. KG, 587 Hemer-Sundwick, Federal Republic of Germany. Readings were obtained on black-glass standards.

Specimens were prepared by knife coating and drying in the air to ensure coatings of equal thickness and eliminate deviations due to the backing.

c. Comparative Experiment

For this purpose, formulations are produced as described under a), except that in case c (1) no (b) was added, in case c (2) only (a) was added and in case c (3) only ($\beta$) was added.

The results obtained with these formulations have also been included, by way of comparison, in the Tables which follow.

EXAMPLES 2 TO 4

The procedure described in Example 1 is followed. However, the ratio of tris-diethylaminobenzenemethylene-copper phthalocyanine to dodecylbenzenesulfonic acid is varied as follows:

Example 2: molar ratio 1:1.5
Example 3: molar ratio 1:2
Example 4: molar ratio 1:4.5

The rheological and tinctorial properties of toluene-based gravure printing inks produced therefrom are shown in Tables 1, 2 and 3. The tests were carried out as described in Example 1(b).

TABLE 1

| Example | Additive $PS_n^1$ : $DBS^2$ | Gloss[3] [%] | $\tau_o^4$ [dyn . cm$^{-2}$] | $\eta\infty^4$ [cP] |
|---|---|---|---|---|
| 1 | 1 : 3 | 95 | 0 | 32 |
| 2 | 1 : 1.5 | 85 | 0 | 32 |
| 3 | 1 : 2 | 88 | 0 | 31 |
| 4 | 1 : 4.5 | 95 | 0 | 29 |
| 1 c [1] | 0 : 0 | 65 | 24 | 28 |
| 1 c [2] | 1 : 0 | 60 | 0 | 37 |
| 1 c [3] | 0 : 1 | 72 | 86 | 26 |

[1]$PS_n$ = tris-methylenediethylamino-copper phthalocyanine
[2]DBS = dodecylbenzenesulfonic acid
[3]Black glass standard 100%, measured by means of the Gardner Multigloss Meter at 45°
[4]Fluid limit $\tau_o$ and ultimate viscosity $\eta\infty$ according to N. Casson in "Rheology of Disperse Systems", pages 84–104, edited by C. C. Mill, Pergamon Press, New York, 1959.

TABLE 2

| | | Tinctorial assessment at ⅓ standard shade (⅓ SS) | | |
|---|---|---|---|---|
| Example | Additive $PS_n^1$ : $DBS^2$ | relative color strength [%] | hue T[3] | saturation S[3] |
| 1 | 1 : 3 | 117.2 | 18.12 | 6.48 |
| 2 | 1 : 1.5 | 106.8 | 18.18 | 6.46 |
| 3 | 1 : 2 | 107.5 | 18.19 | 6.48 |
| 4 | 1 : 4.5 | 106.8 | 18.10 | 6.50 |
| 1 c [1] | 0 : 0 | 90.0 | 18.15 | 6.35 |
| 1 c [2] | 1 : 0 | 100.0 | 18.20 | 6.33 |
| 1 c [3] | 0 : 1 | 80.7 | 18.16 | 6.32 |

[1]$PS_n$ = tris-methylenediethylamino-copper phthalocyanine
[2]DBS = dodecylbenzenesulfonic acid
[3]according to DIN 6164 (standard light, type C); color experts regard a difference of 0.04 unit in either T or S to be distinctly discernible. In the case of S, a higher numerical value indicates greater purity.

TABLE 3

| | Particle size distribution parameter [1] | | |
|---|---|---|---|
| Example | Particle Size $D_z[\mu]^2$ | Width of distribution$\delta$ [3] | Specific surface area calculated from the distribution [m$^2$/g] |
| 1 | 0.069 | 0.440 | 89.6 |
| 2 | 0.098 | 0.248 | 44.8 |
| 3 | — | — | — |
| 4 | — | — | — |
| 1 c 1 | 0.135 | 0.114 | 28.5 |
| 1 c 2 | 0.154 | 0.180 | 26.5 |
| 1 c 3 | 0.140 | 0.120 | 25.3 |

[1]See also DIN 53,206 and W. Batel "Einfuhrung in die Korngroßenmeßtechnik", Springer-Verlag, 1960
[2]$D_z$: the particle size for which 50% of the mass of particles are greater and 50% are smaller than this value
[3]Logarithmic normal distribution

EXAMPLES 5 TO 23

The procedure described in Example 1 is followed, but instead of tris(diethylaminomethylene)-copper phthalocyanine the same amount of the phthalocyanine derivatives shown in Table 4 is used. Fluid formulations with tinctorial properties which virtually correspond to those of the paste obtained according to Example 1 are again produced.

TABLE 4

| Ex. | Phthalocyanine derivative | n [mean value] | rheological properties of the paste |
|---|---|---|---|
| 5 | CuPc$\left[-SO_2-NH-(CH_2)_3-N(CH_3)_2\right]_n$ | 3 | very fluid |
| 6 | CuPc$\left[-CH_2-CH_2-COOC_2H_4-N(C_2H_5)_2\right]_n$ | 3 | very fluid |
| 7 | CuPc$\left[-CH_2-NH-C_2H_5\right]_n$ | 3 | fluid |
| 8 | CuPc$\left[-SO_2-N\bigcirc NH\right]_n$ | 3 | fluid |
| 9 | CuPc$\left[-SO_2NH-(CH_2)_3-NH(CH_2)_3-NH-(CH_2)_3-NH_2\right]_n$ | 3 | fluid |
| 10 | Pc$\left[-CH_2N(C_2H_5)_2\right]_n$ | 3 | very fluid |
| 11 | CuPc$\left[-SO_2NH-(CH_2)_3-NH-\bigcirc H\right]_n$ | 2–3 | very fluid |
| 12 | CuPc$\left[-SO_2NH-(CH_2)_2-N(C_2H_5)_2\right]_n$ | 3 | very fluid |
| 13 | CuPc$\left[-CH_2-CH_2-COOC_3H_6-N(C_2H_5)_2\right]_n$ | 3 | very fluid |
| 14 | CuPc$\left[-SO_2-NH-(CH_2)_3NH-C_{18}H_{37})\right]_n$ | 2–3 | very fluid |
| 15 | CuPc$\left[-SO_2-N\bigcirc N-CH_3\right]_n$ | 3.5 | fluid |
| 16 | CuPc$\left[-SO_2-N\bigcirc N-C_2H_5\right]_n$ | 3 | fluid |
| 17 | CuPc$\left[-SO_2-NH-(CH_2)_3-N(CH_3)\bigcirc H\right]_n$ | 2.7 | very fluid |
| 18 | CuPc$\left[-CH_2-N(C_4H_9)_2\right]_n$ | 2.5 | very fluid |
| 19 | CuPc$\left[-SO_2NH-CH(CH_3)-(CH_2)_3-N(C_2H_5)_2\right]_n$ | 3.2 | very fluid |
| 20 | CuPc$\left[-SO_2-NH-C(CH_3)_2-CH_2-N(CH_3)(CH_2-CH_2-CH_2-CH_3)\right]_n$ | 2.5 | fluid |
| 21 | CuPc$\left[-SO_2-NH-CH_2-CH_2-CH(CH_3)-N(C_2H_5)_2\right]_n$ | 2.7 | fluid |
| 22 | CuPc$\left[-SO_2-NH-CH_2-CH_2-CH_2-CH_2-N(C_2H_5)_2\right]_n$ | 2.7 | fluid |
| 23 | CuPc$\left[-SO_2-NH-(CH_2)_5-N(CH_3)_2\right]_n$ | 3.2 | fluid |

CuPc = copper phthalocyanine
Pc = metal-free phthalocyanine

The production of toluene-based gravure printing inks was carried out as in Example 1 (b). The gloss was determined as in Example 1. The exceptional improvement in gloss was selected as the most conspicuous feature.

The measurements obtained are listed in Table 5 below.

TABLE 5

| Pigment paste obtained according to Example | Gloss of draw-downs Gloss of a draw-down, measured in % of a black standard |
|---|---|
| 1 c2) (Comparison I) | 60 |
| 1 a) | 95 |
| 5 | 92 |
| 6 | 84 |
| 7 | 81 |
| 8 | 75 |
| 9 | 68 |
| 10 | 90 |

TABLE 5-continued

| Pigment paste obtained according to Example | Gloss of a draw-down, measured in % of a black standard |
|---|---|
| 11 | 87 |
| 12 | 91 |
| 13 | 94 |
| 14 | 89 |
| 15 | 85 |
| 16 | 81 |
| 17 | 87 |
| 18 | 92 |
| 19 | 91 |
| 20 | 89 |
| 21 | 94 |
| 22 | 92 |
| 23 | 93 |

EXAMPLE 24 a. 20 parts of β-copper phthalocyanine, 2.5 parts of trisdiethylaminomethylene-copper phthalocyanine and 2.5 parts of dodecylbenzenesulfonic acid are dispersed for 2 hours in 75 parts of toluene in a stirred ball mill (attrition mill). A very fluid paste is obtained, which is very suitable for pigmenting surface coatings and printing inks, especially for toluene-based gravure printing inks and polyamide resins containing gravure printing inks.

b. Comparative Experiment

The procedure described under (a) is followed, but no dodecylbenzenesulfonic acid is added. A viscous paste is obtained, which does not flow and can only be removed from the stirred vessel after more toluene has been added.

EXAMPLES 25 TO 38

To procedure described in Example 24 is followed, but instead of dodecylbenzenesulfonic acid the sulfonic acids mentioned in Table 6 below are employed, in the stated amounts. Pastes which have the rheological properties shown in column 5 are obtained.

Colored surface finishes were produced from the resulting pastes as described in Example 1 (b) and the gloss of these draw-downs was determined.

TABLE 6

| Example | Sulfonic acid | Amount [parts] | Gloss of a draw-down [%] | rheological properties of the paste |
|---|---|---|---|---|
| 24 b) | (comparison) | 0 | 62 | does not flow |
| 24 a) | dodecylbenzenesulfonic acid | 2.5 | 95 | very fluid |
| 25 | 2,4-bis-dodecylphenol-6-sulfonic acid | 2.3 | 94 | very fluid |
| 26 | 3-nonylphenol-2-sulfonic acid | 2.5 | 92 | pasty |
| 27 | stearylsulfonic acid ($C_{18}H_{37}$—$SO_3H$) | 1.9 | 83 | pasty |
| 28 | hexadecylbenzenesulfonic acid | 2.1 | 85 | pasty |
| 29 | decylbenzenesulfonic acid | 2.5 | 91 | fluid |
| 30 | 1-octene-1-sulfonic acid | 2.3 | 78 | pasty |
| 31 | 1-hexadecene-2-hydroxy-1-sulfonic acid | 2.5 | 92 | fluid |
| 32 | 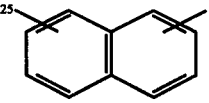 | 2.3 | 93 | very fluid |
| 33 | 2-hydroxyoctadecenesulfonic acid | 2.3 | 92 | fluid |
| 34 | 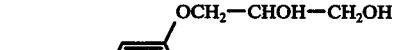 | 2.0 | 87 | very fluid |
| 35 | 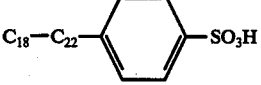 | 2.5 | 90 | fluid |
| 36 | 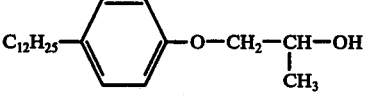 | 2.6 | 85 | fluid |
| 37 | $C_{10}$—$C_{12}$—$SO_3H$ | 2.4 | 93 | fluid |
| 38 | $C_{14}$—$C_{16}$—$SO_3H$ | 2.4 | 93 | fluid |

EXAMPLE 39

23 parts of a mixture of α- and β-copper phthalocyanine, 7 parts of a mixture of tetra- and tris-dimethylaminomethylene-copper phthalocyanine ($n$ = 3.2), 20 parts of a 50% strength zinc resinate solution in toluene, 11 parts of 2,4-bis-dodecylbenzenesulfonic acid and 10 parts of an agent which prevents penetration of the finished printing ink and is marketed under the name ®COLOROL are dispersed in 30 parts of toluene in an attrition mill. A fluid concentrate is obtained. By simply stirring this into a suitable binder solution, ready-to-use deeply colored printing inks are obtained which are outstandingly suitable for, eg., gravure printing with toluene as the solvent. The ink has good floro characteristics. The prints (colorations) obtained with these printing inks exhibit high gloss and a very pure shade.

A similar result is obtained if in place of zinc resinate other resins, eg. calcium resinate, rosin or dimerized rosin are used.

EXAMPLE 40 a. Preparation of the salt of α) and β):
100 parts of

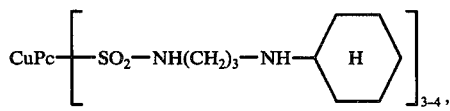

which contains on average of 3.5 basic radicals, and 100 parts of dodecylbenzenesulfonic acid (molar ratio about 1:3) are worked in a kneader at 80° C to form the salt. After cooling, the salt can be ground to a powder.

b. Pigment formulation:

4 parts of the salt obtained according to a) and 16 parts of a β-copper phthalocyanine are dispersed in 80 parts of toluene in an attrition mill. A very fluid formulation is obtained which is outstandingly suitable for coloring printing inks and surface coatings.

EXAMPLE 41

80 parts of α-copper phthalocyanine in the form of a pigment, and 20 parts of the salt obtained according to Example 40 (a) are kneaded in a Sigma-kneader in the presence of 40 parts of propanol. The solvent is evaporated off in the kneader and the resulting formulation, which is in the form of lumps, is ground to a powder in a pindisc mill.

The formulaton obtained is of universal applicability, eg. in solvent-based printing inks or surface coatings. The formulation can be incorporated into the printing inks or surface coatings with the aid of a dissolver. The quality of the colorations obtained with these printings inks or surface coatings is significantly superior to that obtained with pigments of the prior art.

EXAMPLE 42

The procedure described in Example 41 is followed, but instead of the salt, the corresponding amount of the constituents, namely diethylaminomethylene-copper phthalocyanine with a mean value of n of 3.5, and stearylsulfonic acid, are used.

The formulation obtained has the same properties as that obtained according to Example 41.

EXAMPLE 43

The procedure described in Example 41 is followed, except that in place of an α-copper phthalocyanine a β-copper phthalocyanine is used.

EXAMPLE 44

75 parts of crude copper phthalocyanine (manufactured from phthalodinitrile and copper-I chloride in nitrobenzene, in the presence of ammonia) are ground dry with 25 parts of the salt obtained according to Example 40 a) in a ball mill at 105° C for 50 hours. 6 parts of a clay commercially available under the tradename ®BENTONE 35 are then added and the mixture is homogenized. A pigment formulation is obtained which exhibits very good dispersibility and very good flow characteristics, especially in toluene-based surface finishes for gravure application. The prints obtained with such inks have very high gloss.

EXAMPLE 45

75 parts of α-copper phthalocyanine and 25 parts of the salt obtained according to Example 40 a) are homogenized dry in a mixer. The formulation thus obtained is stable in organic fluids such as benzene, toluene and xylene. Conversion to the β-modification does not take place even on extended contact with these fluids.

The product can therefore be used particularly in the gravure printing of illustrations, for decorative paints and in surface coatings.

EXAMPLES 46 TO 50

The pigment formulations were prepared as in Example 45, but instead of α-copper phthalocyanine the pigments shown in Table 7 below were used.

TABLE 7

| Ex. | Pigment | Parts | Amount added (in parts) of the salt of α and β |
|---|---|---|---|
| 46 | ε-copper phthalocyanine | 75 | 25 |
| 47 | α-phthalocyanine | 75 | 15 |
| 48 | β-phthalocyanine | 85 | 15 |
| 49 | polychloro-copper phthalocyanine | 55 | 15 |
| 50 | chloro-bromo-copper-[1] phthalocyanine | 55 | 15 |

[1]15% of chlorine and 46% of bromine

EXAMPLE 51 a. 1 part of $$\left[ CuPc\text{—}SO_2\text{—}NH(CH_2)_3\text{—}HN\text{—}\underset{}{\bigcirc}\text{H} \right]_n$$

(mean value of $n = 3$) is reacted with 1.5 parts of dodecylphenolsulfonic acid in aqueous suspension at 50° C, to give the salt (molar ratio about 1:3). The dye salt formed is filtered off and dried.

b. 12.5 parts of the salt (a), 37.5 parts of a crude copper phthalocyanine and 300 parts of sodium chloride are kneaded for 10 hours in 55 parts of ethylene glycol. The salt and ethylene glycol are then dissolved out with water. The dried pigment formulation exhibits very good dispersibility in solvent-based printing inks and surface finishes. The colorations obtained with the formulation exhibit a high gloss. As compared to formulations which only contain basic copper phthalocyanine derivatives, the new formulations show no bleeding when used in printing inks, and very good fastness to overcoating. In addition, the inks and surface coatings show very good flow characteristics.

EXAMPLES 52 TO 58 a. The salts are prepared from the phthalocyanine derivatives mentioned in Table 8, and dodecylphenolsulfonic acid, by the method described in Example 51 (a). The molar ratio of phthalocyanine derivative to sulfonic acid is 1:3.

b. Formulations are prepared from 12.5 parts of the salt obtained according to a) and crude copper phthalocyanine, by the method described in Example 51 (b). The formulations obtained exhibit similar properties to those obtained according to Example 51 (b).

TABLE 8

| Ex. | Phthalocyanine derivative | n |
|---|---|---|
| 52 | 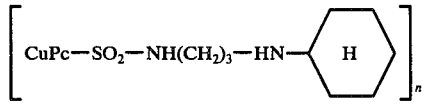 | 3.2 |

TABLE 8-continued

| Ex. | Phthalocyanine derivative | n |
|---|---|---|
| 53 | CuPc$-\!\!\left[-SO_2-NH-(CH_2)_3-N\begin{array}{c}C_2H_5\\C_2H_5\end{array}\right]_n$ | 3.2 |
| 54 | CuPc$-\!\!\left[-SO_2-N-\underset{H}{\overset{CH_3}{C}}-(CH_2)_2-N\begin{array}{c}C_2H_5\\C_2H_5\end{array}\right]_n$ | 3.5 |
| 55 | CuPc$-SO_2-\!\!\left[-NH(CH_2)_3-\overset{H}{N}-C_{18}H_{37}\right]_n$ | 3.5 |
| 56 | CuPc$\left[-CH_2-NH_2\right]_n$ | 3.5 |
| 57 | CuPc$-\!\!\left[-CH_2-\overset{H}{N}-C_6H_{13}\right]_n$ | 3.2 |
| 58 | CuPc$-\!\!\left[-SO_2-NH(CH_2)_4-N\begin{array}{c}C_2H_5\\C_2H_5\end{array}\right]_n$ | 2.7 |

EXAMPLES 59 TO 65

75 parts of crude copper phthalocyanine (obtained from phthalodinitrile and copper-I chloride in nitrobenzene, in the presence of ammonia) are ground with 25 parts of a mixture of diethylaminomethylene-copper phthalocyanine, containing an average of 3.5 methylene groups per molecule and with the sulfonic acid mentioned in Table 9 below (molar ratio of phthalocyanine derivative : sulfonic acid = 1:3.2) for 50 hours in a ball mill. 6 parts of a clay are then added and the mixture is homogenized.

The formulations obtained, after incorporation into, eg., a toluene-based surface finish for gravure application (®ALBERTOL-KP 670), on a ®RED DEVIL vibrator, give very glossy prints.

The pigment content of the printing inks is 8%, based on the ink. Table 9 shows the gloss of draw-downs of these printing inks on a cellulose acetate film, in comparison to those obtained with a commercial copper phthalocyanine pigment.

TABLE 9

| | | Gloss of the printing ink on a cellulose acetate film, in % of a standard, after a dispersing time of | |
|---|---|---|---|
| Example | Sulfonic acid | 5 minutes | 50 minutes |
| 59 | 2,4-di-$C_{12}H_{25}$-phenol-6-$SO_3H$ | 107.4 | 111 |
| 60 | R-phenyl-$OCH_2$-CH(OH)-$CH_2$OH with $SO_3H$; alkyl of 18 to 20 carbon atoms | 109.2 | 112.9 |
| 61 | $C_9H_{19}$-phenol-$SO_3H$ | 82.5 | 98.1 |
| 62 | linear aliphatic sulfonic acid of 13 to 17 carbon atoms | 109.2 | 109.2 |
| 63 | $HO_3S$-naphthyl-$C_{18}H_{37}$ | 83.5 | 91.7 |
| 64 | $HO_3S$-naphthyl-($C_{12}H_{25}$)$_2$ | 99.8 | 100 |

TABLE 9-continued

| Example | Sulfonic acid | Gloss of the printing ink on a cellulose acetate film, in % of a standard, after a dispersing time of | |
|---|---|---|---|
| | | 5 minutes | 50 minutes |
| 65 | 1-octene-1-sulfonic acid + 1-hydroxyoctene-1-sulfonic acid (ratio 70 : 30) | 105.6 | 107.4 |
| (Comparison) | Commercially available pigment, after the same treatment | 35.3 | 70.0 |

EXAMPLE 66 a. The manufacture of the salt from ($\alpha$) and ($\beta$) is carried out as described in Example 40 (a), except that the molar ratio of phthalocyanine derivative to dodecylbenzenesulfonic acid is 1:4.

b. 80 parts of crude copper phthalocyanine and 20 parts of the salt obtained according to a) are converted to a formulation as described in Example 44.

The formulation obtained is more or less equal to that obtained in Example 44 (a). It is particularly suitable for coloring printing inks and surface coatings containing aromatics.

EXAMPLE 67

A formulation is prepared from 60 parts of a $\beta$-copper phthalocyanine pigment and 9 parts of the salt of tris-methylenediethylamino-copper phthalocyanine ($n = 3.5$) and dodecylbenzenesulfonic acid (molar ratio 1:2) by the method described in Example 40 (b), in aqueous suspension, with the addition of 3 parts of a surface-active agent, in a sand mill.

The pigment is filtered off, washed with water and dried.

The formulation is particularly suitable for use in melamine baking finishes and in gravure printing inks, where it is distinguished by high gloss and high purity (of shade).

We claim:

1. A finely divided solid to pasty phthalocyanine formulation which is stable against recrystallization and change of modification, which gives colorations having good gloss, and which consists essentially of
   a. a finely divided phthalocyanine dispersed in insoluble form as the pigment and (b) from 10 to 40 percent by weight, based on (a), of a salt or the corresponding homogeneous mixture, also dispersed in insoluble form, of
   ($\alpha$) one or more phthalocyanine derivatives of the formula

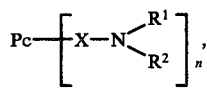

where Pc is an n-valent radical of the metal-free phthalocyanine, of a copper phthalocyanine or of a mixture of these, X is —CH$_2$—,

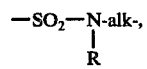

—CH$_2$—CH$_2$—COO—C$_2$H$_4$— or —CH$_2$—CH$_2$—COO—C$_3$H$_6$—, R$^1$ is hydrogen, alkyl of 1 to 20 carbon atoms, phenyl, phenyl which is substituted by methyl, methoxy, ethoxy or chlorine, —(C$_2$H$_4$—NH)$_z$H or —(C$_3$H$_6$—NH)$_z$H, R$^2$ is hydrogen, alkyl of 1 to 6 carbon atoms or cycloalkyl of 6 to 8 carbon atoms, alk is linear or branched saturated alkylene of 2 to 6 carbon atoms, R is hydrogen or alkyl of 1 to 4 carbon atoms, and R and R$^2$ may be linked to one another, n is a number from 2 to 5, z is an integer from 1 to 3 and the group

may also be a heterocyclic ring selected from the group consisting of morpholinyl, thiomorpholinyl, piperazinyl, N-methylpiperazinyl, N-ethylpiperazinyl, piperidinyl, pyrrolidinyl and

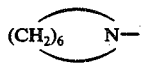

and ($\beta$) a saturated or unsaturated aliphatic sulfonic acid of 8 to 20 carbon atoms, a benzenesulfonic or naphthalenesulfonic acid, substituted by one or two alkyl groups each of 6 to 20 carbon atoms, and in which the benzene or naphthalene nucleus can be substituted by a hydroxyl group, or mixtures thereof, the molar ratio of ($\alpha$) : ($\beta$) being from 1:1 to 1:5, and the said salt or corresponding mixture acting as a stabilizer in the formulation.

2. A formulation as claimed in claim 1, wherein the content of (b) is from 20 to 30% by weight, based on (a).

3. A formulation as claimed in claim 1, wherein the molar ratio of ($\alpha$) to ($\beta$) is from 1:2 to 1:4.

4. A formulation as claimed in claim 2, wherein the molar ratio of ($\alpha$) to ($\beta$) is from 1:2 to 1:4.

5. A formulation as claimed in claim 1, which contains, as (a), metal-free phthalocyanine, copper phthalocyanine, copper phthalocyanine which contains up to 2 chlorine atoms or bromine atoms in the molecule, polychloro-copper phthalocyanine with from 3 to 16 chlorine atoms or polychlorobromo-copper phthalocyanine with from 1 to 14 chlorine atoms and from 15 to 2 bromine atoms in the molecule.

6. A formulation as claimed in claim 1, which contains, as ($\alpha$), one or more phthalocyanine derivatives of the formula

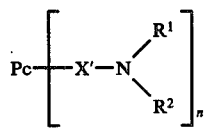

where Pc' is an n-valent copper phthalocyanine radical, X' is

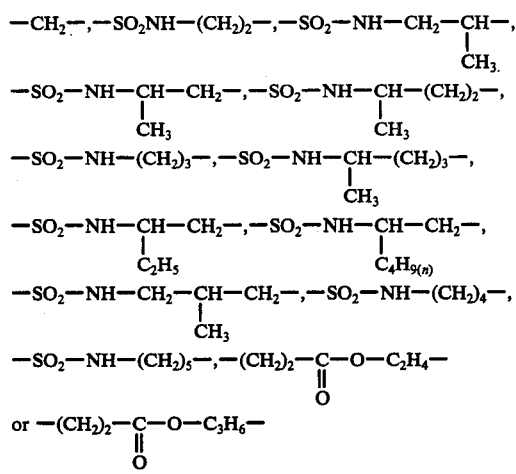

and $R^1$ and $R^2$ have the meanings given in claim 1.

7. A formulation as claimed in claimed in claim 6, wherein $R^1$ is alkyl of 1 to 10 carbon atoms, $-(C_2H_4-NH)_zH$ or $-(C_3H_6-NH)_zH$, $R^2$ is alkyl of 1 to 4 carbon atoms or cyclohexyl, and z is 1, 2 or 3.

8. A formulation as claimed in claim 1, which contains, as (β), saturated or unsaturated aliphatic sulfonic acids of 10 to 20 carbon atoms, or monoalkylbenzenesulfonic or dialkylbenzenesulfonic acids where alkyl is of 8 to 18 carbon atoms, or monoalkylnaphthalenesulfonic or dialkylnaphthalenesulfonic acids where alkyl is of 8 to 18 carbon atoms, in which the benzene or naphthalene nucleus may carry a hydroxyl group or a mixture of these acids.

9. A formulation as claimed in claim 1, which contains, as sulfonic acids (β): dodecylbenzenesulfonic acid, dodecylphenolsulfonic acid, didodecylphenolsulfonic acid, dodecylnaphtholsulfonic acid, nonylphenolsulfonic acid, nonylbenzenesulfonic acid, octadecylphenolsulfonic acid, octadecylsulfonic acid, hexadexylsulfonic acid, 1-tetradecen-1-sulfonic acid, 1-octadecene-1-sulfonic acid, hydroxyoctadecylsulfonic acid, dodecylnaphthol-(1)-sulfonic acid, didodecyl-naphthol-(1)-sulfonic acid, octyl-naphthol-(1)-sulfonic acid and dioctylnaphthol-(1)-sulfonic acid.

10. A formulation as claimed in claim 8, wherein phthalocyanine derivatives (α) which are used are those of the formula

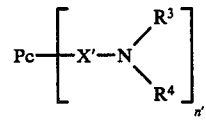

in which X' is $-CH_2-$ or $-SO_2-NH-alk'$, $R^3$ is hydrogen or alkyl of 1 to 4 carbon atoms, $R^4$ is alkyl of 1 to 4 carbon atoms or cyclohexyl, alk' is linear or branched saturated alkylene of 2 to 6 carbon atoms and n' is a number from 2 to 5.

11. A solids formulation as claimed in claim 1 in the form of a pulverulent homogeneous mixture.

12. A pasty formulation as claimed in claim 1 in which components (a) and (b) are suspended as insoluble particles in an organic fluid medium selected from the group consisting of aromatic hydrocarbons, halohydrocarbons, alcohols, glycols, glycol monoalkyl ethers, polyglycols, diacetone alcohol, benzyl alcohol, phenol, substituted phenols, naphthols, substituted naphthols, ketones, $C_1$ to $C_5$ alkyl esters of acetic acid, propionic acid, glycollic acid, lactic acid, carboxylic acid amides and N-methylpyrrolidone and mixtures thereof.

13. A pasty formulation as claimed in claim 12 including a natural, synthetic or semi-synthetic resin dissolved in said organic fluid.

14. A pasty formulation as claimed in claim 12 wherein the amount of (b) is from 20 to 30% by weight, based on (a).

* * * * *

UNITED STATES PATENT AND TRADEMARK OFFICE
CERTIFICATE OF CORRECTION

PATENT NO. : 4,069,064
DATED : January 17, 1978
INVENTOR(S) : Nett et al

It is certified that error appears in the above-identified patent and that said Letters Patent are hereby corrected as shown below:

In column 22, line 2, please change

"1-tetradecen-1-sulfonic acid" to

--1-tetradecene-1-sulfonic acid--.

Signed and Sealed this

Thirty-first Day of October 1978

[SEAL]

Attest:

RUTH C. MASON
Attesting Officer

DONALD W. BANNER
Commissioner of Patents and Trademarks